United States Patent
Klimmek et al.

(10) Patent No.: US 11,728,637 B2
(45) Date of Patent: Aug. 15, 2023

(54) DEVICE FOR COMMUNICATION BETWEEN A CONTROLLER AND A FIELD DEVICE

(71) Applicant: Phoenix Contact GmbH & Co. KG, Blomberg (DE)

(72) Inventors: Benjamin Klimmek, Aerzen (DE); Felix Schulte, Geseke (DE)

(*) Notice: Subject to any disclaimer, the term of this patent is extended or adjusted under 35 U.S.C. 154(b) by 0 days.

(21) Appl. No.: 17/508,509

(22) Filed: Oct. 22, 2021

(65) Prior Publication Data
US 2022/0131360 A1 Apr. 28, 2022

(30) Foreign Application Priority Data
Oct. 22, 2020 (DE) .......................... 102020127777.6

(51) Int. Cl.
*H02H 3/02* (2006.01)
*H02H 9/00* (2006.01)
*H02H 1/00* (2006.01)

(52) U.S. Cl.
CPC .......... *H02H 3/025* (2013.01); *H02H 1/0007* (2013.01); *H02H 9/00* (2013.01)

(58) Field of Classification Search
CPC .......... H02H 9/042; H02H 9/00; H02H 3/025; H02H 1/0007
See application file for complete search history.

(56) References Cited

U.S. PATENT DOCUMENTS

| | | | |
|---|---|---|---|
| 6,215,633 B1* | 4/2001 | Galecki | H04M 19/001 361/111 |
| 2004/0019440 A1* | 1/2004 | Selli | G01D 3/08 702/57 |
| 2009/0290276 A1* | 11/2009 | Carcouet | H02H 9/042 361/93.9 |
| 2016/0241023 A1* | 8/2016 | Bentley | H02H 9/025 |
| 2016/0259752 A1* | 9/2016 | Brodbeck | G05B 19/0423 |
| 2019/0123548 A1* | 4/2019 | Kn | H02H 9/008 |

* cited by examiner

*Primary Examiner* — Scott Bauer
(74) *Attorney, Agent, or Firm* — Weber Rosselli & Cannon LLP

(57) ABSTRACT

A device, preferably a plug-in module, for communication between a controller and a field device. The device includes contacts, wherein a first subset of the contacts is electrically conductively connected or connectable to the controller and a second subset of the contacts is electrically conductively connected or connectable to the field device. The apparatus further includes a circuit having an input electrically conductively connected to the first subset of the contacts and an output electrically conductively connected to the second subset of the contacts. The circuit includes a voltage-limiting unit adapted to limit a voltage at the output, and a current-limiting unit adapted to limit a current between the input and the output and to interrupt the current when the voltage-limiting unit responds.

20 Claims, 4 Drawing Sheets

DEVICE FOR COMMUNICATION BETWEEN A CONTROLLER AND A FIELD DEVICE

FIELD

The disclosure relates to a device for communication between a controller and a field device, in particular in a potentially explosive atmosphere.

BACKGROUND

The process industry is currently undergoing major change. In the case of modernization measures at existing plants, for example for the production or processing of crude oil (a so-called "brown field") and/or the faster construction of new plants (for example a so-called "green field"), time savings and thus significant cost reductions are desired during implementation.

Herein, products for the oil and gas market are not exhaustive examples of is devices for communication between a controller and one or more field devices. For such devices to be widely used, they must be quick and easy to use for processing signals, such as measurement and control signals.

U.S. Pat. No. 9,971,727 B2 describes a universal input and output interposer system for processing an input or output (IO) signal transmitted between a field device and a controller.

For a broad consideration and application of such devices, for example in the area of detailed planning and control, procurement and execution of construction and installation work (so-called "Engineering-Procurement-Construction", short EPC) or in the operation of process plants (for example by a so-called "Main Automation Contractor", short MAC) a fast and simple integration of an open system is desired.

For example, the controller may provide universal input and output interfaces that are configurable programmatically to elementary functions, such as digital output, digital input, analog output, or analog input.

However, it must often be ensured that in the event of a fault on the control side or the field side, no heat or ignition source occurs in the field that could lead to fires or explosions. Traditionally, the current supplied to the field device is limited by means of an appropriately selected resistor (e.g., resistance). However, this conventional resistive current limiting leads to permanent power losses in a control cabinet. Conventional current limiting is therefore not energy-efficient or may conflict with a compact design of the device.

Furthermore, the power dissipation of the conventional current limiters can cause heating, especially in the event of a fault, so that the conventional current limiter itself is a source of danger (i.e., safety hazard) for fires or explosions.

SUMMARY

Thus, it is the object of the disclosure to provide a device for communication between a controller and a field device that is more energy efficient and/or safeguards operation in a potentially explosive atmosphere.

The task is solved with the features of the independent claim. Practical embodiments and advantageous further developments of the disclosure are given in the dependent claims.

Examples of embodiments of the disclosure are described below with partial reference to the figures.

One aspect relates to a device, such as a plug-in module, for communication between a controller and a field device. The device, such as the plug-in module, comprises contacts, wherein a first subset of the contacts is electrically conductively connected or connectable to the controller and a second subset of the contacts is electrically conductively connected or connectable to the field device. The device, such as the plug-in module, further comprises a circuit (e.g., a circuitry) having an input electrically connected to the first subset of the contacts and an output electrically connected to the second subset of the contacts. The circuit comprises a voltage-limiting unit configured to limit a voltage at the output, and a current-limiting unit configured to limit a current between the input and the output and to interrupt the current when the voltage-limiting unit responds (e.g., upon response or action of the voltage-limiting unit).

Embodiments of the device can satisfy an ignition protection type due to the limitation of current and voltage at the output. These or further embodiments of the device can reduce a power dissipation in the device by means of the current-limiting unit.

The same or further embodiments of the device can reduce waste heat (for example, during normal operation and/or when the voltage-limiting unit and/or the current-limiting unit responds) in the device, for example, to prevent a fire hazard or an explosion hazard due to the device and/or for a denser arrangement of multiple devices (for example, multiple plug-in modules on a base module) and/or for a more compact design of the device.

The device may be designed or configured for secondary explosion protection. The device may be designed or configured (for example, in accordance with an Ordinance on Industrial Safety and Health [e.g., German: Betriebssicherheitsverordnung, abbreviated to: BetrSichV], and/or the Ordinance on Hazardous Substances, [e.g., German: Gefahrstoffverordnung, abbreviated to: GefStoffV]) for use in a Zone 2 or an area in which a hazardous explosive atmosphere as a mixture of air and flammable gases, vapors or mists does not normally occur in normal operation, and if it does, then only rarely and for a short time.

The first subset and the second subset may be disjoint.

Herein, an electrically conductive connection (for example, components such as units that are "electrically conductively connected") may include galvanic, inductive, and/or capacitive coupling.

The current between the input and the output may correspond to the current at the input and/or at the output. Furthermore, the current at the input and the current at the output may (for example, substantially) match.

The voltage-limiting unit may be designed or configured to limit the voltage at the output to a voltage limit value, such as by means of a Z-diode or a varistor. The voltage limit value may be equal to or greater than 28 V. Alternatively or complementarily, the voltage limit value may be equal to or less than 32 V. The voltage-limiting unit may respond when the voltage at the output exceeds the voltage limit value.

The current-limiting unit may be designed or configured to limit the current to a current limit value, such as by means of a switching element. The switching element may comprise a switching transistor, for example a metal oxide semiconductor field effect transistor (MOSFET).

The current limit value may be equal to or greater than 150 mA or 170 mA. Alternatively or additionally, the current limit value may be equal to or less than 170 mA or 200 mA. The current-limiting unit may respond when the current exceeds the current limit value.

The current-limiting unit may comprise a switching element. The switching element may comprise an input, an output, and a signal input. The switching element may be designed or configured to electrically conductively connect the input of the switching element and the output of the switching element in a (e.g. current-) conducting switching state and to electrically disconnect the input of the switching element and the output of the switching element (for example, without galvanic isolation) in a current-interrupting switching state. The current-limiting unit may further be designed or configured to detect the current at the signal input and to control (for example clock) the switching state depending on the detected current.

The current-limiting unit may further comprise a measuring resistor and/or a detecting resistor.

The input of the switching element may be electrically conductively connected (for example directly) to the input of the current-limiting unit. The output of the switching element may be electrically conductively connected to the output of the current-limiting unit via the measuring resistor. The signal input of the switching element (for example, the signal input for detecting the current) may be electrically conductively connected to the output of the current-limiting unit via the detecting resistor. Alternatively or complementarily, the output of the switching element may be electrically conductively connected (for example, directly) to the output of the current-limiting unit. The input of the switching element may be electrically conductively connected to the input of the current-limiting unit via the measuring resistor. The signal input of the switching element (for example, the signal input for detecting the current) may be electrically conductively connected to the input of the current-limiting unit via the detecting resistor.

The current-limiting unit and the measuring resistor may be connected in series (for example along a main direction of the current).

The detecting resistor (e.g., a detection resistance) may be several times greater than the measuring resistor (e.g., a measurement resistance).

The measuring resistor may have an electrical resistance between $1\Omega$ (1 ohm) and $2\Omega$. For example, the measuring resistor may be $1.2\Omega$. The measuring resistor may also be called a shunt resistor or shunt resistor.

The detecting resistor may have an electrical resistance equal to or greater than $1\ k\Omega$ (kiloohm) or $10\ k\Omega$. The detecting resistor may also be referred to as sensing resistor or tap resistor.

The switching element may be clocked (e.g., by means of a microcontroller), optionally between a current-conducting switching state and a current-interrupting switching state, such as by means of pulse width modulation. For example, the switching element may be alternately in the current-conducting switching state and in the current-interrupting switching state according to the pulse width modulation.

Embodiments of the device may limit the current due to the clocked switching state without operating the switching element in a dissipative region. Thus, the power dissipation in the device by means of the current-limiting unit may be reduced, for example compared to a conventional resistive current limiting.

A duty cycle of the pulse width modulation may be a monotonically decreasing function of the current (for example, the instantaneous current in the current-conducting switching state). For example, the duty cycle may be inversely proportional to a positive difference between the current (for example, the instantaneous current in the current-conducting switching state) and the current limit value.

If the current is less than the current limit value, the duty cycle may be equal to one. Alternatively or additionally, the duty cycle may be zero when the voltage limit value is reached and/or exceeded.

The duty cycle may be the ratio of the duration of a switch-on phase of the switching transistor to a period duration of the pulse width modulation. The period duration of the pulse width modulation (i.e., the inverse frequency of the pulse width modulation and/or the sum of the duration of the turn-on phase and the duration of a turn-off phase of the switching transistor) may be constant. For example, the frequency of the pulse width modulation may be greater than 1 kHz (kilohertz).

The voltage-limiting unit and the current-limiting unit and/or the further current-limiting unit may be connected in series. Alternatively or additionally, the current-limiting unit may be connected between the input and the output. The voltage-limiting unit may be connected in parallel to the output to limit the voltage at the output.

Embodiments of the device may derive current through the voltage-limiting unit in response to the voltage-limiting unit responding, due to the parallel connection of the voltage-limiting unit at the output. Due to the series connection of the voltage-limiting unit and the current-limiting unit, the current-limiting unit may interrupt or limit the current in response to the response of the voltage-limiting unit (for example, in response to the current being diverted).

The voltage-limiting unit may be designed or configured to short-circuit the output in response to the output voltage limiting. The current-limiting unit may be designed or configured to interrupt or limit the current in response to the short circuit of the output.

The contacts may be designed or configured for pluggable electrically conductive connection to a base module. The first subset of the contacts may be electrically conductively connected or connectable to the controller via the base module. The second subset of the contacts may be electrically conductively connected or connectable to the field device via the base module.

The plug-in module or the base module may be designed or configured as a transfer element, for example on the control side (for example on the first subset of the contacts or on a connection to the control) or on the field side (for example on a connection to the field device or the second subset of the contacts).

The device may comprise a printed circuit board (PCB for short) on which the circuit is arranged. Conductive traces on the circuit board may electrically connect the circuit to the contacts. The contacts may include exposed ends of the conductive traces at an edge of the circuit board.

The device may further comprise a further voltage-limiting unit which is designed or configured to limit a voltage at the input. The further voltage-limiting unit may be designed or configured to limit the voltage at the input to a further voltage limit value, such as by means of a further Z-diode or a further varistor.

The further voltage limit value of the voltage-limiting unit may be equal to or greater than the further voltage limit value of the further voltage-limiting unit.

The input or first subset of the contacts may comprise at least two input poles. The output or the second subset of the contacts may comprise at least two output poles. One of the input poles, for example a positive pole or a phase, may optionally be electrically conductively connected to one of the output poles by means of the current-limiting unit. Alternatively or additionally, another of the input poles, for example a negative pole, a ground potential or a ground potential, may be permanently electrically conductively connected to another of the output poles.

The at least two poles of the input may comprise poles of a power supply. Alternatively or additionally, the at least two poles of the input may be electrically conductively connected or connectable to general purpose input/output (GPIO) terminals of the controller.

The input or the first subset of contacts may comprise at least two input poles. One of the input poles, for example a positive pole or a phase, may be electrically conductively connected to one of the input poles, for example a negative pole, a ground potential or a ground potential, by means of the further voltage-limiting unit when responding (i.e., upon the response), the output or the second subset of the contacts may comprise at least two output poles and one of the output poles, for example a positive pole or a phase, may be electrically conductively connected by means of the voltage-limiting unit when responding (i.e., upon the response) to one of the output poles, for example a negative pole, a ground potential or a ground potential.

Optionally, the input may further comprise a control signal from the controller. The circuit may further be configured to selectively electrically connect the output to the input or to a power supply in accordance with the control signal. The circuit may further be configured to electrically isolate the input terminals (for example, of the power supply) from the output in the unconnected state (i.e., in the current-interrupting switching state).

The output of the current-limiting unit may be electrically conductively connected to the voltage-limiting unit. Alternatively or additionally, an input of the current-limiting unit may be electrically conductively connected to the further voltage-limiting unit.

The circuit may further comprise a capacitance connected in parallel with the current-limiting unit. The capacitance may be designed or configured to transmit a fieldbus signal from the input to the output independently of a switching state of the current-limiting unit. The fieldbus signal may comprise a signal according to IEC 61158 or Highway Addressable Remote Transducer (HART).

Alternatively or additionally, the capacitance may be designed or configured to smooth a switching of the switching element (for example the switching transistor) in the current-limiting unit and/or the pulse width modulation. The switching state of the current-limiting unit may correspond to the switching state of the switching element.

For example, the circuit may be designed or configured to drive a solenoid valve as the field device.

Another aspect relates to a system comprising the device (for example, the plug-in module) according to the one aspect and a base module. The base module may be configured to plugably receive the device (for example, the plug-in module).

The base module may include complementary contacts (for example, to the contacts of the device) for pluggable electrically conductive connection to the contacts of the device. A first subset of the complementary contacts may respectively contact the first subset of the contacts of the received device. A second subset of the complementary contacts may respectively contact the second subset of the contacts of the received device. The base module may include a control-side terminal electrically connected to the first subset of the complementary contacts. The base module may further comprise a field-side terminal that is electrically conductively connected to the second subset of the complementary contacts.

BRIEF DESCRIPTION OF THE DRAWINGS

In the following, the disclosure is explained in more detail with reference to the drawings by means of preferred embodiments.

It is shown.

DETAILED DESCRIPTION

Figure 1:
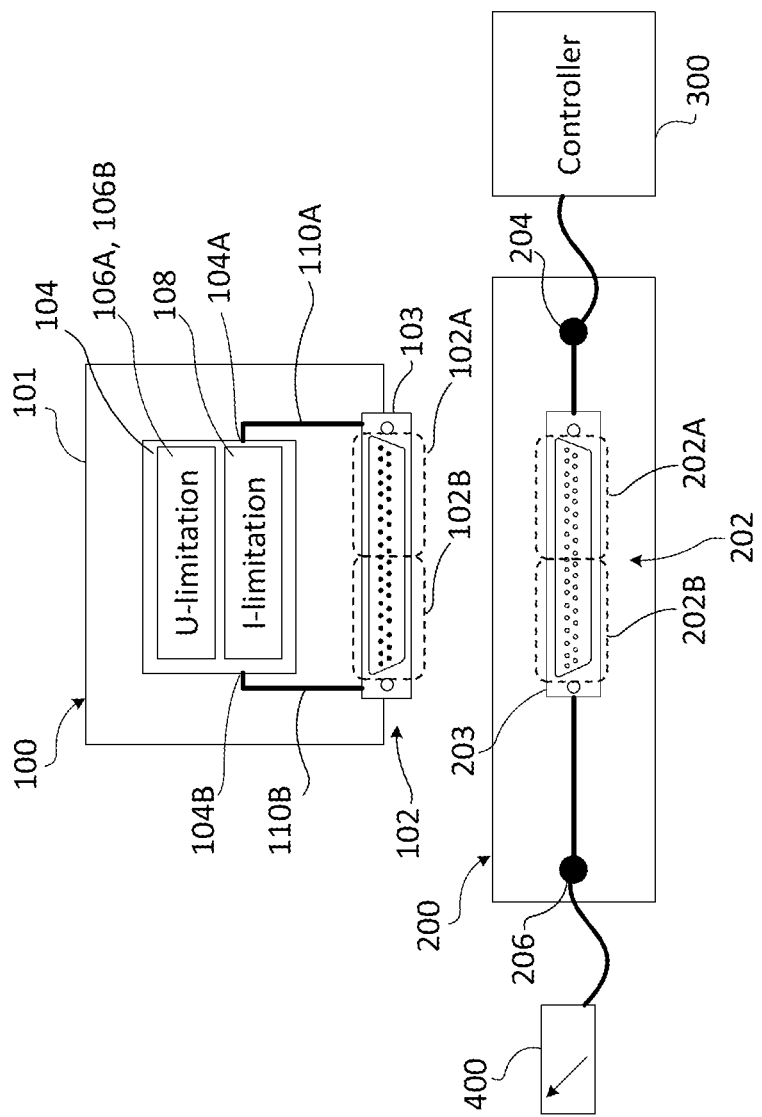
FIG. 1 a schematic representation of a device for communication between a controller and a field device according to a first embodiment.

FIG. 1 shows a schematic representation of an embodiment of a device, generally designated by reference numeral 100, for communication between a controller 300 and a field device 400. The device 100 may be in the form of a plug-in module 100 for electrical and mechanical connection to a base module 200.

The device 100 includes contacts 102, a first subset 102A of the contacts 102 being electrically conductively connected or connectable to the controller 300. A second subset 102б of the contacts 102 is electrically conductively connected or connectable to the field device 400.

For example, the contacts 102 may be implemented by means of a connector half 103. The device 100 further comprises a circuit 104. An input 104A of the circuit 104 is electrically conductively connected to the first subset 102A of the contacts 102. An output 104б of the circuit 104 is electrically conductively connected to the second subset of the contacts 102. The circuit 104 includes a voltage-limiting unit 106B configured to limit a voltage at the output 104B, and a current-limiting unit 108 configured to limit a current between the input 104A and the output 104B and to interrupt the current when the voltage-limiting unit 106A or 106B responds.

While the first embodiment of the device 100 shown in FIG. 1 is connectable to the controller 300 and the field device 400 via a pluggable connection 103 and 203, in a variant of each embodiment, the controller 300 and the field device 400 may be directly connectable to the device 100 (for example, by means of corresponding connections 204 and 206 of the device 100, respectively).

The base module 200 is configured for pluggably receiving the device 100 (for example, the plug-in module 100). The base module 200 comprises complementary contacts 202 for pluggable electrically conductive connection to the contacts 102 of the device 100. For example, the contacts 202 may be implemented by means of a connector half 203 complementary to the connector half 103 (for example, a slot matching the contacts).

For example, the electrical and mechanical coupling between the plug-in module 100 and the base module 200 is provided by an existing connector half 103 in the base of the plug-in module 100. This connector half 103, together with the counterpart 203, i.e. the complementary connector half 203, forms an interface 103, 203 to the base module 200.

A first subset 202A of the complementary contacts 202 may respectively contact the first subset 102A of the contacts of the received device 100. A second subset 202B of the complementary contacts 202 may respectively contact the second subset 1026 of the contacts 102 of the received device 100. The base module 200 includes a control side terminal 204 electrically connected to the first subset 202A of the complementary contacts 202. The base module 200 further comprises a field-side terminal 206 electrically conductively connected to the second subset 202B of the complementary contacts 202.

Any embodiment described herein may be designed or configured to comply with the European Union (EU) Directive on Explosion Protection (French: ATmosphères Explosibles, or ATEX for short). The ATEX comprises two directives, namely the ATEX Product Directive 2014/34/EU and the ATEX Operational Directive 1999/92/EC. Alternatively or additionally, any embodiment described herein may be designed or configured to comply with provisions of IECEx. IECEx is a non-governmental system under the auspices of the International Electrotechnical Commission (IEC).

Any embodiment of the device 100 described herein may be realizable as a non-ignitable (technically referred to as "non-incendive") plug-in module, for example, in accordance with ATEX and/or IECEx in Europe and/or in accordance with a so-called "non-incendive" ignition protection type in the United States. Non-ignition capability or non-incendivity is a frequent requirement in the process industry.

The non-ignition capability or non-incendivity may be satisfied due to current and voltage limiting without using resistive current and voltage limiting. As a result, embodiments of the device 100 may avoid exposing components thereof to high power dissipation at maximum load. In particular, a fire of a transfer element in control cabinets may be avoided.

The circuit 104 may further be configured to process signals. For example, the circuit 104 may comprise a signal processing circuit (SPC for short). A range of functions for signal processing the signal received at the input 104A from the controller 300 to the field side output at the output 1046 (or the reverse signal direction) may include any variety. Without limitation as to further signal processing functions, the present description addresses functions for non-firing use cases.

Embodiments of the device 100 offer the possibility of bringing the power dissipation of previous non-ignitable circuits, in particular previous resistive circuits, to as low a level as possible, thus ensuring the necessary ignition protection type.

For this purpose, the aforementioned SPC 104 of the plug-in module 100 comprises a circuit 106A, 1066 and 108 that maintains the current of the field device 400 as a load and the voltage at the required protection level. For example, this circuit 104 may be designed or configured to control a solenoid valve, optionally supplemented by a galvanic isolation between input 104A and output 104B.

The aim of the following circuit is to minimize the current problems of other products available on the market. Currently, said circuits for "non-incendive" products are mainly built on a resistive basis. This always implies the problem that in the event of a fault (or high continuous load) a power dissipation of, for example, 5 W can emitted at a resistor. This adds up in a system according to the required channels (for example the control 300). In individual cases, this power loss can lead to burnt-out circuits in control cabinets.

The circuit 104 in embodiments of the device 100 may be configured to allow currents less than the current limit value of, for example, 170 mA to flow to the field device 400 as a load. Any currents greater than the current limit value are limited to the current limit value. A significantly lower power dissipation is established at the components based on the voltage drop across the current-limiting unit 108 (for example, as electronic control).

This lower power dissipation makes it possible to design the device 100 in a more compact way and in accordance with the conditions, which, for example, fits well in a housing 101 of the plug-in module 100. The narrow design is compact and modular (for example, interchangeable). Embodiments may be compatible with programmable logic controllers (PLCs), a process control system, or a distributed control system (DCS for short) as a controller 300. Furthermore, embodiments may be compatible with Universal Input/Output Systems (in technical terms, "Universal I/O System") in which input 104A is connected or connectable to a program-based configurable interface of the controller 300.

Figure 2:
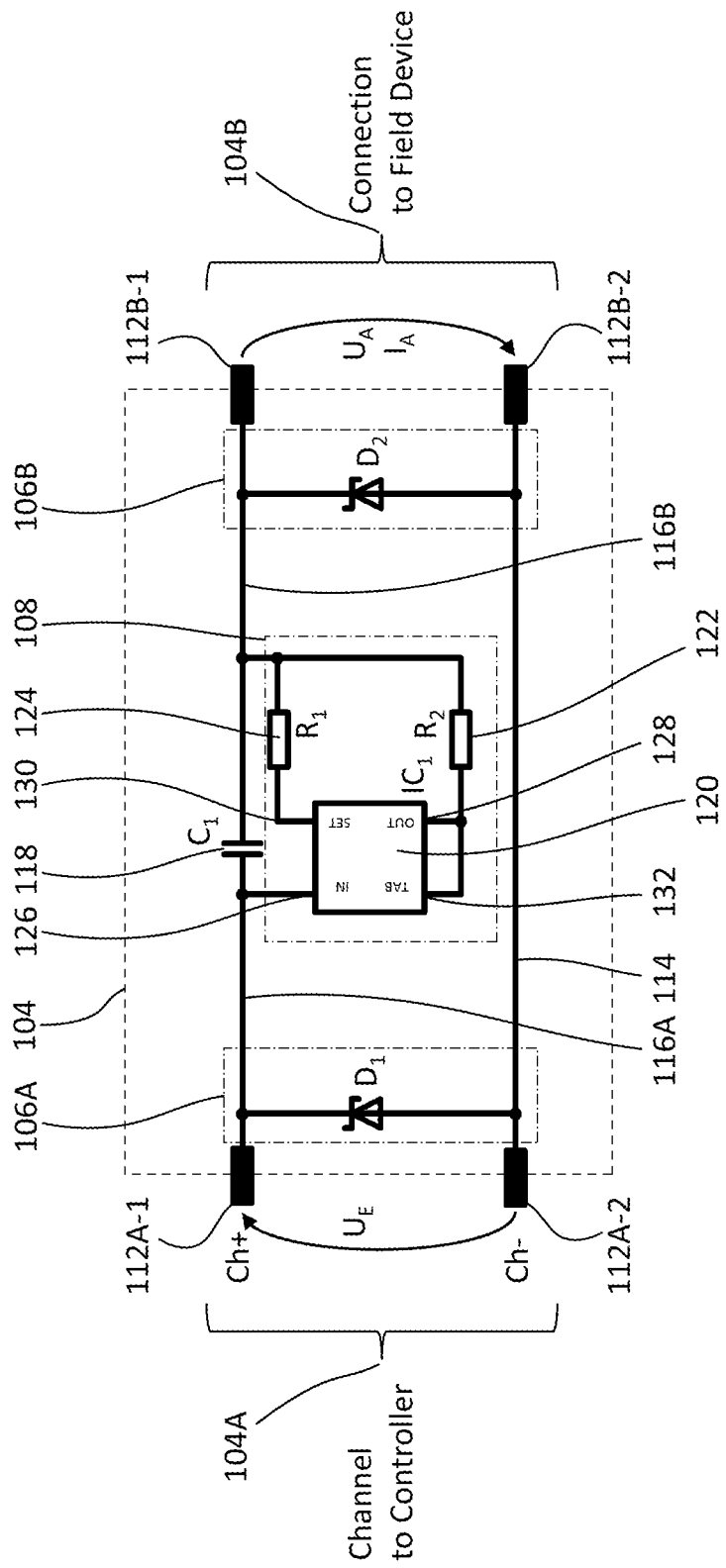
FIG. 2 a schematic representation of the device for communication between a controller and a field device according to a second embodiment.

FIG. 2 shows a schematic diagram of the device 100 for communication between the controller 300 and the field device 400 according to a second embodiment. The second embodiment example may be realizable by itself or as a further development of the first embodiment example.

The current-limiting unit 108 comprises a switching element 120. The switching element 120 comprises an input 126, an output 128, and a signal input 130. The switching element 120 is configured to electrically conductively connect the input 126 of the switching element 120 and the output 128 of the switching element 120 in a conducting switching state, and to electrically disconnect the input 126 of the switching element 120 and the output 128 of the switching element 120 in a current-interrupting switching state. The current-limiting unit 108 may be further configured to detect or sense the current as a voltage signal at the signal input 130, and to control the switching state depending on the sensed or detected current.

The current-limiting unit 108 further comprises a measuring resistor 122 and a detecting resistor 124. The input 126 of the switching element 120 is electrically conductively connected to the input 116A of the current-limiting unit 108. The output 128 of the switching element 120 is electrically conductively connected to the output 116B of the current-limiting unit 108 via the measuring resistor 122. The signal input 130 of the switching element 120 for detecting the current is electrically conductively connected to the output 1166 of the current-limiting unit 108 via the detecting resistor 124. Since the resistors 122 and 124 are connected in parallel with respect to the output 116B, and no significant voltage is dropped across the detecting resistor 124 (due to the low current flow through the detecting resistor 124), the current-dependent voltage drop across the measuring resistor 122 is present at the signal input 130.

Each embodiment of the device 100 may be configured to include either the voltage-limiting unit 106B or the further voltage-limiting unit 106A, or both.

The further voltage-limiting unit 106A and the voltage-limiting unit 106B may include a first Z-diode $D_1$ and a second Z-diode $D_2$, which set the current (for example, the output current $I_A$) to zero at an input voltage $U_E$ and an output voltage $U_A$, respectively, greater than the voltage limit value $U_{WP}$ (for example, 28 V). Optionally, the voltage-limiting units 106A and 106B may each have different voltage limit values.

The circuit 104 (which may also be referred to as an ignition protection circuit) includes, as a current-limiting unit 108, an integrated circuit ($IC_1$) having an electronic control that limits the current (for example, the output current $I_A$) to $I_{WP}$ (for example, 170 mA or 5 W/$U_{WP}$) at an output voltage $U_A$ that is less than the voltage limit $U_{WP}$.

The current-limiting unit 108 includes a measuring resistor 122 (also: output resistor) $R_2$ through which the $IC_1$ 108 outputs the limited current $I_A$. The $IC_1$ 108 detects the voltage drop across the output resistor $R_2$ as a measure of the output current $I_A$ via a detecting resistor (also tap resistor) $R_1$.

Optionally, the $IC_1$ 108 includes a TAB attachment point 132 for mounting the raw $IC_1$ 108 directly on the printed circuit board 101 (PCB for short), i.e., for so-called tape-automated bonding (TAB). Heat from the reduced power dissipation of the $IC_1$ 108 may be dissipated to a cooling element on the PCB 101 via the TAB attachment point 132.

Optionally, the circuit 104 includes a capacitor $C_1$ 118, which connects input 104A and output 104B of the ignition protection circuit. Via this, a high frequency component may be passed through the circuit 104 independently of the current-limiting unit 108 acting on the direct current (DC) component.

Figure 3:
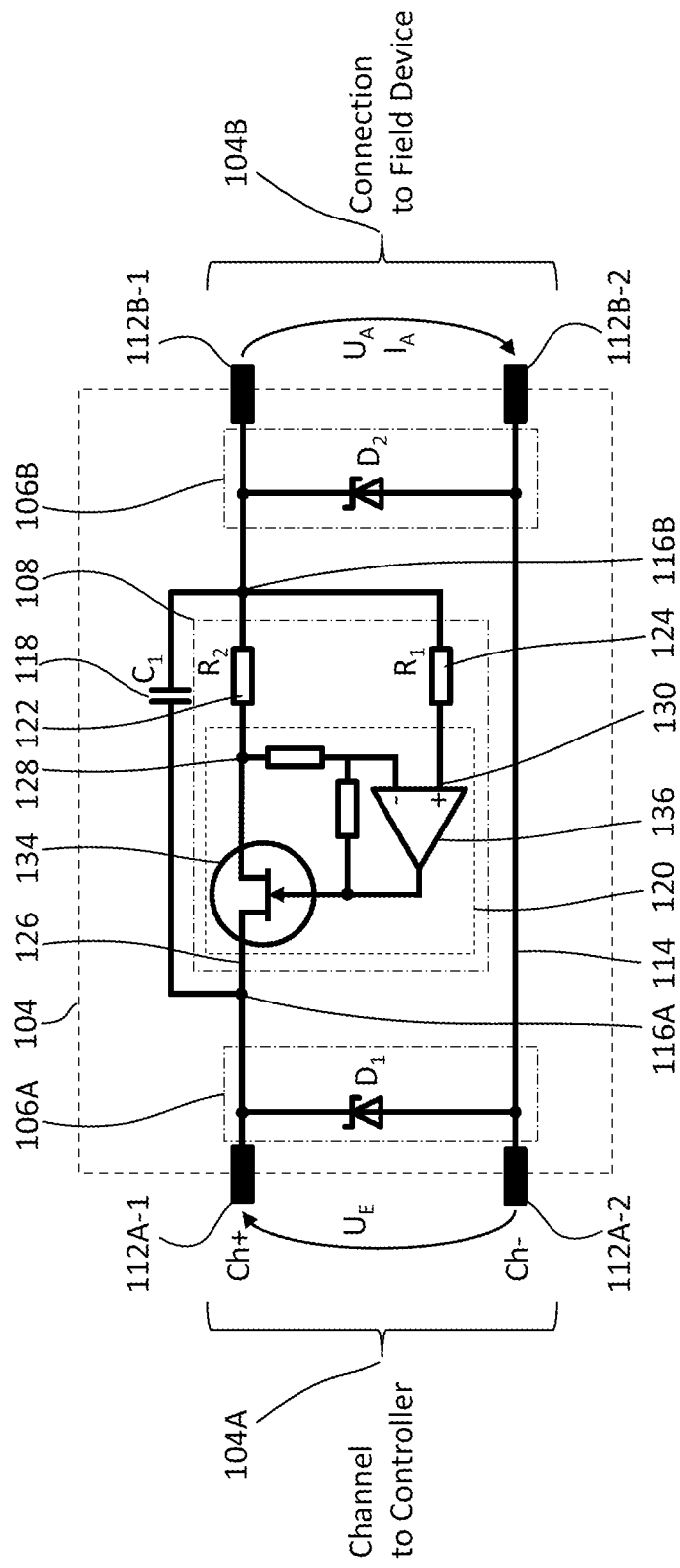
FIG. 3 a schematic representation of the device for communication between a controller and a field device according to a third embodiment.

FIG. 3 shows a schematic diagram of the device 100 for communication between the controller 300 and the field device 400 according to a third embodiment, which may be combinable with the first or second embodiment of the device 100.

In order to minimize the power dissipation in $IC_1$ 108, the switching transistor 134 in $IC_1$ 108 may be switched through at the operating point ($U_{WP}$, $I_{WP}$). This means that the relationship $R_2=(U_E-U_{WP})/I_{WP}$ may apply or hold between the output resistor $R_2$, the input voltage $U_E$, and the voltage limit $U_{WP}$.

The current-limiting unit 108 may include a differential amplifier 136 (for example inverted on the output side) that detects (i.e., senses) the current at the input 130 as a voltage drop across the measuring resistor 122 via the detecting resistor 124, and controls the switching state of the switching transistor 134 as a function of the current. This control may further comprise pulse width modulation of the switching state of the switching element 120 (for example, the switching transistor 134).

Figure 4:
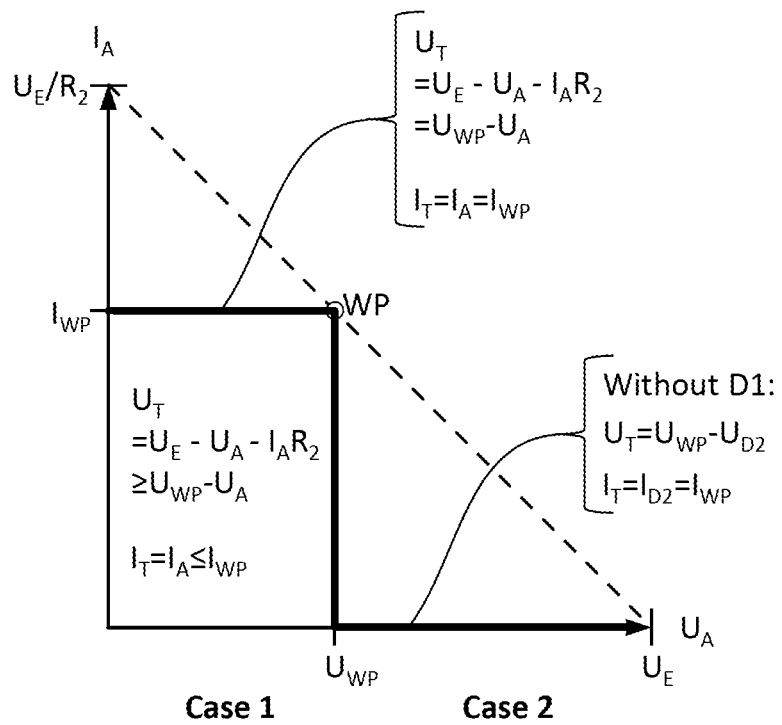
FIG. 4 a schematic current-voltage diagram for the output of the circuit of the device.

In FIG. 4, the conventional resistive limiting and electronic limiting of an embodiment of the device 100 are schematically shown graphically in an output characteristic to show the differences between the conventional resistive circuits and the circuit 104.

The dashed line represents the behavior of a resistive circuit. The full line represents the output characteristic of circuit 104 (e.g. an electronic control). Both circuits, are intended to provide the necessary type of ignition protection at the work point (WP for short). For example, the WP corresponds to the current limit value (for example 170 mA) and the voltage limit value (for example 28 V).

The current limit value and the voltage limit value may be defined by the values required by the directive for IECEx and ATEX or an ignition protection type for protection in hazardous areas (for example, so-called Ex products). In principle, any embodiment of the circuit 104 may be formed for any predetermined current limit value and/or voltage limit value. Therefore, the values for current, voltage and power mentioned herein are assumed to be exemplary only.

By clocking the switching element 120 (for example, the switching transistor 134) to limit the current $I_A$ at the output 104B to the current limit value $I_{WP}$, the power dissipation $P_{LOSS}=I_A$ ($U_{WP}-U_A$) can be prevented or reduced in the switching element 120 (for example, the switching transistor 134) of the current-limiting unit 108.

FIG. 4 shows the limitation of the voltage $U_A$ at the output 104B to the voltage limit value $U_{WP}$ ("case 1") and of the current $I_A$ at the output 104B to the current limit value $I_{WP}$ achievable by embodiments of the device 100. "Case 2" shows (also for a variant of the embodiments without the further, i.e. input side, voltage-limiting unit 106A, for example without the Z-diode D1) how the current is interrupted in case of an output side overvoltage.

Figure 5:
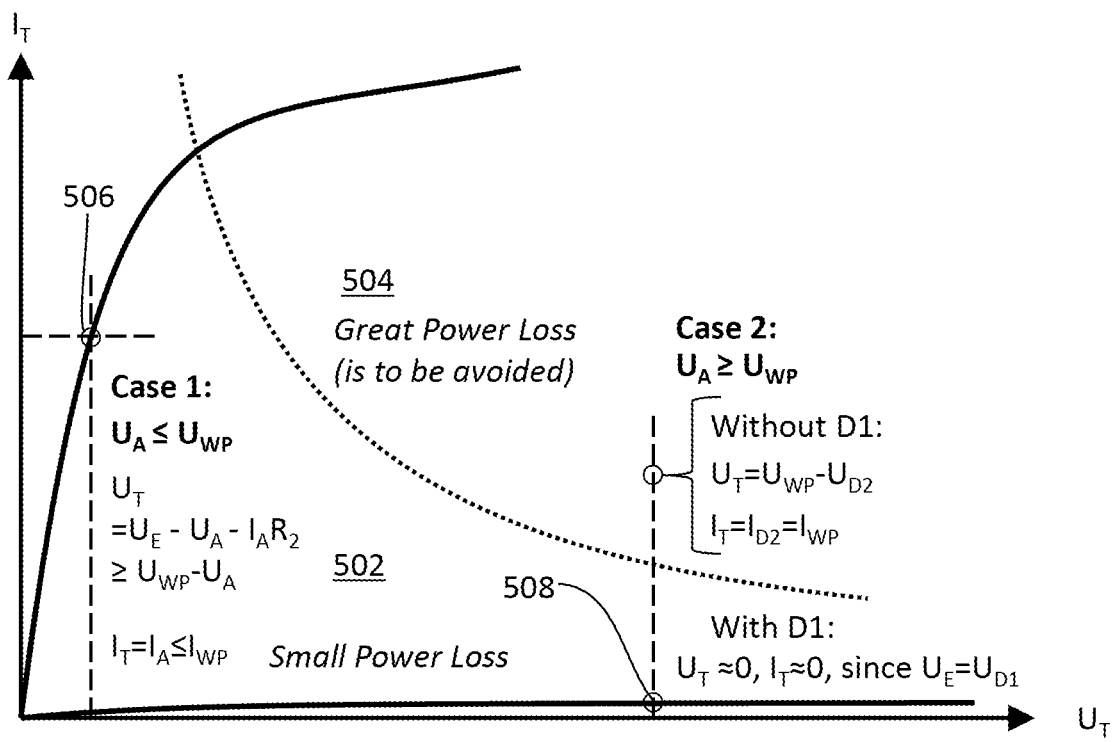
FIG. 5 a schematic current-voltage diagram for the switching element of the circuit of the device.

FIG. 5 schematically shows the voltage $U_T$ applied to the switching element 134 (for example, between the source and drain) and the current $I_T$ flowing through the switching element 134. In the exemplary case of an n-channel MOSFET as the switching element 134, the current may be $I_{DS}=I_T$ and the voltage may be $U_{DS}=U_T$ at the source "S" and the drain "D".

By alternating (for example, clocking, for example according to pulse width modulation) between the conductive (i.e., closed) switching state 506 and the current-interrupting switching state 508, the current can be limited and the switching element 134 can always be operated in the switching region 502. A large power dissipation in the dissipative region 504 can thus be avoided.

Although the disclosure has been described with reference to exemplary embodiments, it will be apparent to those skilled in the art that various modifications may be made and equivalents may be used as substitutes. Further, many modifications may be made to adapt a particular situation or material to the teachings of the invention. Consequently, the disclosure is not limited to the disclosed embodiments, but encompasses all embodiments falling within the scope of the appended claims.

| List of reference signs | |
|---|---|
| Device, for example a plug-in module | 100 |
| Device board | 101 |
| Contacts of the device, for example plug-in contacts of the plug-in module | 102 |
| First subset of contacts | 102A |
| Second subset of contacts | 102B |
| Connector half | 103 |
| Circuit of the device | 104 |
| Input of the circuit | 104A |
| Output of the circuit | 104B |
| Other voltage-limiting unit | 106A |
| Voltage-limiting unit | 106B |
| Current-limiting unit | 108 |
| Conductive traces (or tracks) to the first subset of contacts | 110A |
| Conductive traces (or tracks) to the second subset of contacts | 110B |
| Input poles | 112A |
| Output poles | 112B |
| Permanent connection | 114 |
| Input of the current-limiting unit | 116A |
| Output of the current-limiting unit | 116B |
| Capacitance, for example a capacitor | 118 |
| Switching element | 120 |
| Measuring resistor | 122 |
| Detecting resistor | 124 |
| Input of the switching element | 126 |
| Output of the switching element | 128 |
| Signal input of the switching element | 130 |
| Attachment point of the Tape-Automated Bonding (TAB) | 132 |
| Switching transistor, for example a MOSFET | 134 |
| Base module | 200 |
| Complementary contacts of the base module | 202 |
| Complementary connector half | 203 |
| Control-side connection | 204 |
| Field-side connection | 206 |
| Controller, e.g., controlling unit | 300 |
| Switching region | 502 |

-continued

| List of reference signs | |
|---|---|
| Dissipative region | 504 |
| Current-conducting switching state of the switching element | 506 |
| Current-interrupting switching state of the switching element | 508 |

The invention claimed is:

1. A device for communication between a controller and a field device, comprising:
   contacts, wherein a first subset of the contacts is electrically connected or connectable to the controller, and a second subset of the contacts is electrically connected or connectable to the field device; and
   a circuit, an input of which is electrically conductively connected to the first subset of the contacts and an output of which is electrically conductively connected to the second subset of the contacts, the circuit comprising a voltage-limiting unit configured to limit a voltage at the output, and a current-limiting unit configured to limit a current between the input and the output and to interrupt the current upon response of the voltage-limiting unit, wherein the current-limiting unit further comprises a measuring resistor and a detecting resistor, wherein an input of a switching element is electrically conductively connected to the input of the current-limiting unit, an output of the switching element is electrically conductively connected to the output of the current-limiting unit via the measuring resistor, and a signal input of the switching element for detecting the current is electrically conductively connected to the output of the current-limiting unit via the detecting resistor.

2. The device according to claim 1, wherein the voltage-limiting unit is configured to limit the voltage at the output to a voltage limit value.

3. The device of claim 2, wherein the voltage-limiting unit includes a Z-diode or a varistor.

4. The device according to claim 1, wherein the current-limiting unit is configured to limit the current to a current limit value.

5. The device according to claim 4, wherein the current-limiting unit is the switching element.

6. The device according to claim 1, wherein the current-limiting unit comprises the switching element, wherein the switching element comprises an input, an output and a signal input, wherein the switching element is configured to
   electrically conductively connect the input of the switching element and the output of the switching element in a conducting switching state and
   electrically disconnect the input of the switching element and the output of the switching element in a current-interrupting switching state,
   the current-limiting unit being further configured to detect the current at the signal input and to control the switching state as a function of the detected current.

7. The device according to claim 1, wherein the voltage-limiting unit and the current-limiting unit are connected in series, or the current-limiting unit is connected between the input and the output, or wherein the voltage-limiting unit is connected in parallel with the output for limiting the voltage at the output.

8. The device according to claim 1, wherein the voltage-limiting unit for limiting the voltage at the output is configured to short-circuit the output upon response, and wherein the current-limiting unit is configured to interrupt the current in response to the short-circuiting of the output.

9. The device according to claim 8, wherein the contacts are configured for pluggable electrically conductive connection to a base module, wherein the first subset of the contacts are electrically conductively connected or connectable to the controller via the base module and the second subset of the contacts are electrically conductively connected or connectable to the field device via the base module.

10. The device according to claim 1, wherein the device comprises a circuit board on which the circuit is disposed, and wherein conductive traces on the circuit board electrically conductively connect the circuit to the contacts.

11. The device according to claim 1, further comprising a further voltage-limiting unit configured to limit a voltage at the input, optionally wherein the further voltage-limiting unit is configured to limit the voltage at the input to a further voltage limit value.

12. The device according to claim 11, wherein the voltage-limiting unit is a Z-diode or a varistor.

13. The device according to claim 1, wherein the input or the first subset of the contacts comprises at least two input poles and the output or the second subset of the contacts comprises at least two output poles, wherein one of the input poles, is selectively electrically conductively connected to one of the output poles by means of the current-limiting unit or wherein one of the input poles, is permanently electrically conductively connected to an output pole.

14. The device according to claim 1, wherein the input or the first subset of the contacts comprises at least two input poles and one of the input poles, is electrically conductively connected to another one of the input poles, by means of the further voltage-limiting unit upon the response, or wherein the output or the second subset of the contacts comprises at least two output poles and one of the output poles, is electrically conductively connected to another one of the output poles, by means of the voltage-limiting unit upon the response.

15. The device according to claim 1, wherein an output of the current-limiting unit is electrically conductively connected to the voltage-limiting unit or wherein an input of the current-limiting unit is electrically conductively connected to the further voltage-limiting unit.

16. A device for communication between a controller and a field device, comprising:
   contacts, wherein a first subset of the contacts is electrically connected or connectable to the controller, and a second subset of the contacts is electrically connected or connectable to the field device; and
   a circuit, an input of which is electrically conductively connected to the first subset of the contacts and an output of which is electrically conductively connected to the second subset of the contacts, the circuit comprising a voltage-limiting unit configured to limit a voltage at the output, and a current-limiting unit configured to limit a current between the input and the output and to interrupt the current upon response of the voltage-limiting unit
   wherein a switching element is clocked between a current-conducting switching state and a current-interrupting switching state.

17. The device according to claim 16, wherein the clocking is achieved via pulse width modulation.

18. The device according to claim 17, wherein a duty cycle of the pulse width modulation is a monotonically decreasing function of the current, or wherein the duty cycle is zero when a voltage threshold is reached or exceeded.

19. A device for communication between a controller and a field device, comprising:
- contacts, wherein a first subset of the contacts is electrically connected or connectable to the controller, and a second subset of the contacts is electrically connected or connectable to the field device; and
- a circuit, an input of which is electrically conductively connected to the first subset of the contacts and an output of which is electrically conductively connected to the second subset of the contacts, the circuit comprising a voltage-limiting unit configured to limit a voltage at the output, and a current-limiting unit configured to limit a current between the input and the output and to interrupt the current upon response of the voltage-limiting unit, and a capacitance connected in parallel with the current-limiting unit.

20. The device of claim 19, wherein the capacitance is adapted to transmit a fieldbus signal from the input to the output independently of a switching state of the current-limiting unit.

* * * * *